United States Patent
Papadopoulos

(10) Patent No.: US 8,027,407 B2
(45) Date of Patent: Sep. 27, 2011

(54) METHOD AND APPARATUS FOR ASYNCHRONOUS SPACE-TIME CODED TRANSMISSION FROM MULTIPLE BASE STATIONS OVER WIRELESS RADIO NETWORKS

(75) Inventor: Haralabos Papadopoulos, San Jose, CA (US)

(73) Assignee: NTT DoCoMo, Inc., Tokyo (JP)

(*) Notice: Subject to any disclaimer, the term of this patent is extended or adjusted under 35 U.S.C. 154(b) by 599 days.

(21) Appl. No.: 11/644,638

(22) Filed: Dec. 21, 2006

(65) Prior Publication Data

US 2008/0123618 A1 May 29, 2008

Related U.S. Application Data

(60) Provisional application No. 60/857,265, filed on Nov. 6, 2006.

(51) Int. Cl.
  H04L 27/00 (2006.01)
  H04B 7/02 (2006.01)
  H03M 13/00 (2006.01)
(52) U.S. Cl. .................. 375/299; 375/267; 714/755
(58) Field of Classification Search .................. 375/299, 375/267; 714/755
  See application file for complete search history.

(56) References Cited

U.S. PATENT DOCUMENTS

| | | | |
|---|---|---|---|
| 5,903,842 A | 5/1999 | Wang et al. | |
| 5,982,327 A | 11/1999 | Vook et al. | |
| 6,629,287 B1 | 9/2003 | Brink | |
| 6,804,307 B1 * | 10/2004 | Popovic | 375/299 |
| 6,862,552 B2 | 3/2005 | Goldstein et al. | |
| 7,042,858 B1 * | 5/2006 | Ma et al. | 370/331 |
| 7,072,295 B1 | 7/2006 | Benson et al. | |
| 7,095,812 B2 * | 8/2006 | Chan et al. | 375/341 |
| 7,251,768 B2 * | 7/2007 | Giannakis et al. | 714/755 |
| 7,308,047 B2 | 12/2007 | Sadowsky | |
| 7,436,895 B1 | 10/2008 | Tujkovic | |
| 7,441,045 B2 | 10/2008 | Skene et al. | |
| 7,564,915 B2 * | 7/2009 | Lee et al. | 375/267 |
| 7,620,117 B2 * | 11/2009 | Chae et al. | 375/299 |
| 2002/0114404 A1 | 8/2002 | Aizawa et al. | |
| 2002/0176431 A1 | 11/2002 | Golla et al. | |
| 2003/0236080 A1 | 12/2003 | Kadous et al. | |

(Continued)

FOREIGN PATENT DOCUMENTS

EP  1162750 A2  12/2001

(Continued)

OTHER PUBLICATIONS

Yiu et al, "Dsitributed Space-Time Block Coding", IEEE Globecom Nov. 2005 proceedings, pp, 52-55.*

(Continued)

*Primary Examiner* — Shuwang Liu
*Assistant Examiner* — Sarah Hassan
(74) *Attorney, Agent, or Firm* — Blakely, Sokoloff, Taylor & Zafman LLP

(57) ABSTRACT

A method and apparatus is disclosed herein for asynchronous space-time coded transmission from multiple stations. In one embodiment, the method comprises one or more terminals and at least two base stations wirelessly communicating information-bearing signals to the one or more terminals using orthogonal space-time block codes. In one embodiment, the proposed codes maintain "orthogonality" at the receiver even in the presence of asynchronous signal reception among signals transmitted from distinct transmit base stations.

15 Claims, 8 Drawing Sheets

$x(1), x(2), \ldots, x(k)$: scalar information-bearing symbols (inputs to baseline OSTBC)
$B$ : output matrix of baseline code of dimension "$l$" times "$n$"
$b_i$ : output vector of baseline code (of dimension "$l$") associated with $i$th transmit antenna
$b_i(m)$ : $m$th output sample of baseline code over $i$th transmit antenna $$B = B(x(1), x(2), \ldots, x(k)) = [\,b_1\ b_2\ \ldots\ b_n\,]$$

$$b_i = b_i(x(1), x(2), \ldots, x(k)) = [\,b_i(1)\ b_i(2)\ \ldots\ b_i(l)\,]^T$$

U.S. PATENT DOCUMENTS

| | | | |
|---|---|---|---|
| 2004/0022179 A1* | 2/2004 | Giannakis et al. | 370/207 |
| 2004/0116146 A1 | 6/2004 | Sadowsky et al. | |
| 2004/0165675 A1 | 8/2004 | Ito et al. | |
| 2004/0205445 A1 | 10/2004 | Xu | |
| 2005/0010675 A1 | 1/2005 | Jaggi et al. | |
| 2005/0047514 A1 | 3/2005 | Bolinth et al. | |
| 2005/0068918 A1 | 3/2005 | Mantravadi et al. | |
| 2005/0111592 A1 | 5/2005 | Yee | |
| 2005/0185707 A1 | 8/2005 | Hoo et al. | |
| 2005/0265280 A1 | 12/2005 | Roh et al. | |
| 2006/0002312 A1 | 1/2006 | Delattre et al. | |
| 2006/0020560 A1 | 1/2006 | Rodriguez et al. | |
| 2006/0029124 A1 | 2/2006 | Grant et al. | |
| 2006/0098760 A1 | 5/2006 | Shen et al. | |
| 2006/0146716 A1 | 7/2006 | Lun et al. | |
| 2006/0146791 A1 | 7/2006 | Deb et al. | |
| 2006/0148506 A1 | 7/2006 | Hoo | |
| 2006/0152391 A1 | 7/2006 | Sakuyama | |
| 2006/0176945 A1 | 8/2006 | Li | |
| 2007/0041475 A1 | 2/2007 | Koshy et al. | |
| 2007/0066229 A1 | 3/2007 | Zhang et al. | |
| 2007/0198899 A1 | 8/2007 | Yellin et al. | |
| 2007/0281633 A1 | 12/2007 | Papadopoulos | |
| 2007/0286313 A1 | 12/2007 | Nikopour-Deilami et al. | |
| 2008/0025430 A1* | 1/2008 | Sadowsky | 375/267 |
| 2008/0075022 A1 | 3/2008 | Lei et al. | |
| 2008/0123781 A1 | 5/2008 | Pisek et al. | |
| 2008/0181339 A1 | 7/2008 | Chen et al. | |
| 2009/0225878 A1 | 9/2009 | Papadopoulos et al. | |

FOREIGN PATENT DOCUMENTS

| | | |
|---|---|---|
| EP | 1383246 A2 | 1/2004 |
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 A1 | 6/2001 |
| WO | WO 2004/045167 A | 5/2004 |
| WO | WO 2004/025011 A | 7/2004 |
| WO | WO 2005/046081 A1 | 5/2005 |
| WO | WO 2006/029050 A | 3/2006 |
| WO | WO 2007/050860 A1 | 5/2007 |
| WO | WO 2007/073267 A1 | 6/2007 |
| WO | WO 2004/056011 A1 | 7/2007 |
| WO | WO 2007/087540 A2 | 8/2007 |
| WO | WO 2007/129990 A1 | 11/2007 |
| WO | WO 2008/057791 A1 | 5/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

Yiu et al. "Distributed Space-Time Block Coding", IEEE Globecome Nov. 2005, pp. 52-55.*

US Final Office Action for U.S. Appl. No. 11/873,248, dated Sep. 1, 2010, 21 pages.

US Office Action for U.S. Appl. No. 11/939,353 dated Jan. 31, 2011, 15 pages.

Sen, et al., "Cute and jCUTE Concolic Unit Testing and Explicit Path Model-Checking Tool", Computer Aided Verification Lecture Notes in Computer Science, Jan. 1, 2006, pp. 419-423.

Majumdar, et al., "Hybrid Concolic Testing", IEEE 29th International Conference on Software Engineering, May 1, 2007, pp. 416-426.

PCT International Preliminary Report on Patentability for PCT Patent Application No. PCT/US2009/046014, dated Dec. 16, 2010, 9 pages.

PCT International Search Report for PCT Patent Application No. PCT/US2010/033549, Jan. 5, 2011, 5 pgs.

PCT Written Opinion of the International Searching Authority for PCT Patent Application No. PCT/US2010/033549, Jan. 5, 2011, 6 pgs.

European Office Action for European Patent Application No. 08767750.6, dated Jan. 12, 2011, 6 pgs.

PCT International Search Report for PCT Patent Application No. PCT/US2010/027139, Dec. 6, 2010, 5 pgs.

PCT Written Opinion of the International Searching Authority for PCT Patent Application No. PCT/US2010/027139, Dec. 6, 2011, 6 pgs.

European Office Action for European Patent Application No. 08767751.4, Jan. 14, 2011, 5 pgs.

US Office Action for U.S. Appl. No. 11/644,638, dated Sep. 22, 2009, 13 pages.

PCT International Preliminary Report on Patentability for PCT Patent Application No. PCT/US2007/013074, dated Dec. 30, 2009, 8 pages.

PCT International Search Report for PCT Patent Application No. PCT/US2008/006287, dated Oct. 2, 2008, 6 pgs.

Written Opinion of the International Searching Authority for PCT Patent Application No. PCT/US2008/006287, dated Oct. 2, 2008, 7 pgs.

PCT International Preliminary Report on Patentability for PCT Patent Application No. PCT/US2008/065675, dated Dec. 17, 2009, 8 pages.

PCT International Search Report for PCT Patent Application No. PCT/US2009/054937, dated Dec. 30, 2009, 7 pgs.

Written Opinion of the International Searching Authority for PCT Patent Application No. PCT/US2009/054937, dated Dec. 30, 2009, 7 pgs.

Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.

PCT International Search Report for PCT Patent Application No. PCT/US2009/56865, dated Mar. 2, 2010, 7 pgs.

Written Opinion of the International Searching Authority for PCT Patent Application No. PCT/US2009/56865, dated Mar. 2, 2010, 12 pgs.

PCT International Search Report for PCT Patent Application No. PCT/US2009/034758, dated Feb. 4, 2010, 7 pgs.

Written Opinion of the International Searching Authority for PCT Patent Application No. PCT/US2009/034758, dated Feb. 4, 2010, 7 pgs.

Sun, Sumei, et al., "Pseudo-Inverse MMSE Based QRD-M Algorithm for MIMO OFDM", Jan. 1, 2006, pp. 1545-1549, vol. 3.

Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.

PCT International Search Report PCT/US2007/023207 mailed Apr. 14, 2008 (3 pages).

PCT Written Opinion PCT/US2007/023207 mailed Apr. 14, 2008 (6 pages).

International Search Report dated Apr. 17, 2009 for PCT/US2008/076252, 5 pages.

Written Opinion of the International Searching Authority dated Apr. 17, 2008 for PCT/US2008/076252, 9 pages.

Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.

Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.

Catt, "Non-codebook based pre-coding for E-UTRA TDD Downlink", 3rd Generation Partnership Project, Oct. 4, 2006, pp. 1-3.

Gomadam, K.S., et al., "Techniques for Multi-user MIMO with Two-way Training", IEEE International Conference on Communications, May 19, 2008, pp. 3360-3366.

Written Opinion of the International Searching Authority dated Apr. 30, 2009 for PCT/US2007/022189, 8 pages.

US Final Office Action for U.S. Appl. No. 12/040,653, dated Jun. 15, 2010, 40 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
Michalke, Clemens, et al., "Linear Momo Receivers vs. Tree Search Detection: A Performance Comparison Overview", IEEE Internatinal Symposium on Personal, Indoor and Mobile Radio Communications, Sep. 11, 2006, pp. 1-7.
Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
US Office Action for U.S. Appl. No. 12/209,110 dated Feb. 11, 2011, 20 pages.
US Office Action for U.S. Appl. No. 12/121,649, Apr. 19, 2011, 25 pgs.
US Office Action for U.S. Appl. No. 12/130,821, Feb. 22, 2011, 12 pgs.
US Office Action for U.S. Appl. No. 12/121,634, Mar. 1, 2011, 19 pgs.
European Office Action for European Patent Application No. 09718026.9, Feb. 10, 2011, 3 pgs.
European Office Action for European Patent Application No. 08756664.2, Mar. 17, 2011, 6 pgs.
US Office Action for U.S. Appl. No. 11/873,248, dated Mar. 31, 2010, 18 pages.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
PCT International Preliminary Report on Patentability for PCT Patent Application No. PCT/US2008/073646, dated Mar. 4, 2010, 6 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
US Office Action for U.S. Appl. No. 11/754,903, dated Mar. 29, 2010, 11 pages.
PCT International Search Report dated Sep. 18, 2008, for PCT/US08/006286, filed May 16, 2008, 4 pages.
Written Opinion of the International Searching Authority dated Sep. 18, 2008, for PCT/US08/006286, filed May 16, 2008, 8 pages.
International Search Report mailed Nov. 6, 2008 for PCT/US08/065675, filed Jun. 3, 2008, 5 pages.
Written Opinion of the International Searching Authority mailed Nov. 6, 2008 for PCT/US08/065675, filed Jun. 6, 2008, 8 pages.
International Search Report for related application WO 08/048651, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.
Joham, M., et al., "Linear Transmit Processing in MIMO Communications Systems", IEEE Transactions on Signal Processing, Aug. 2005, pp. 2700-2712.
Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.
Wiswanath, P., et al., "Sum Capacity of the Multiple Antenna Gaussian Broadcast Channel and Uplink-Downlink Duality", IEEE Transactions on Information Theory, Aug. 2003, pp. 1912-1923.
Marzetta, T.L., "How Much Training Is Required for Multi-User MIMO?", ACSSC96, Asilomar Conference Oct. 2006.
Medard, M., "The Effect upon Channel Capacity in Wireless Communication of Imperfect Knowledge of the Channel", IEEE Transactions on Information Theory, May 2000, pp. 935-945.
Caire, G., et al., "Achievable Throughput of MIMO Downlink Beamforming and Limited Channel Information", Proceedings of IEEE PIMRC, Aug. 2007.
Zhang, H., "Service Disciplines for Guaranteed Performance Service in Packet-Switching Networks", in the Proceedings of the IEEE, vol. 83, No. 10, Oct. 1995, pp. 1-23.
Guerin, R., et al., "Quality-of-Service in Packet Networks: Basic Mechanisms and Directions", Invited Paper, Computer Networks, vol. 31, No. 3, Feb. 1999, pp. 1-16.
Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.
Tse, D., et al., "Fundamentals of Wireless Communication", Cambridge University Press, May 2005.
Horn, R.A., et al., "Matrix Analysis", Cambridge University Press, New York, 1994.
Sezgin, A., et al., "On EXIT-Chart Analysis of Coherent and Non-Coherent Space-Time Codes", Smart Antennas, 2004, pp. 49-56.
El Gamal, H. et al., "Distributed Space-Time Filtering for Cooperative Wireless Networks", GLOBECOM'03, Dec. 2003, pp. 1826-1830.
Wang, H. et al.: "Upper Bounds of Rates of Space-Time Block Codes from Complex Orthogonal Designs," IEEE Trans. Information Theory, pp. 2788-2796, Oct. 2003, 9 pages.
Sharma, N. et al. "Improved Quasi-Orthogonal Codes Through Constellation Rotation," IEEE Trans. Communications, pp. 332-335, Mar. 2003, 3 pages.
Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.
Jafarkani, H., "A Quasi-Orthogonal Space-Time Block Code", IEEE Transactions on Communications, Jan. 2001, 4 pages.
Su, W., et al., "Signal Constellations for Quasi-Orthogonal Space-Time Block Codes with Full Diversity", IEEE Transactions on Information Theory, Oct. 2004, pp. 2231-2347.
Yiu, S., et al., "Distributed Block Source Coding", IEEE Globecom 2005 Proceedings, Nov. 2005.
Jafarkani, H., "Space-Time Coding, Theory and Practice", Cambridge University Press, 2005.
Cormen, T.H., et al., "Introduction to Algorithms", 2nd Edition, MIT Press and McGraw-Hill, 2001, pp. 643-700.
Chou, P.A., et al., "Practical Network Coding", 51st Allerton Conference on Communication, Control and Computing, Oct. 2003, 10 pages.
Li, S. R., et al., "Linear Network Coding", IEEE Transactions on Information Theory, IT-49(2), Feb. 2003, pp. 371-381.
Koetter, R., et al., "An Algebraic Approach to Network Coding", IEEE/ACM Transactions on Networking, vol. 11, No. 5, Oct. 2003, pp. 782-795.
Katti, S., et al., "XORs in the Air: Practical Wireless Network Coding", in the Proceedings of the ACM Special Interest Group on Data Communication (SIGCOMM), Sep. 2006, 12 pages.
Ho, T., et al., "The Benefits of Coding Over Routing in a Randomized Setting", in the Proceedings of the International Symposium on Information Theory (ISIT), Jun. 2003, pp. 1-6.

Ahlswede, R., et al., "Network Information Flow", IEEE Transactions on Information Theory, IT-46(4), Jul. 2000, pp. 1204-1216.
Chou, P.A., et al., "Network Coding for the Internet and Wireless Networks", www.eecs.umich.edu/systems/ChouSeminar.ppt, Mar. 28, 2006, pp. 1-29.
Fasolo, E., "Network coding techniques," www.cs.virginia.edu/{yw5s/Network%20coding.ppt, Mar. 7, 2004, pp. 1-14.
Ernest, P.H.H., et al., "An efficient algorithm for virtual topology reconfiguration in WDM optical ring networks," Proceedings of 10th Conference on Computer Communications and Networks, Oct. 15, 2001, pp. 55-60.
Del Re, Enrico, et al., "Next-Generation Mobile Satellite Networks," IEEE Communications Magazine, vol. 40, No. 9, Sep. 1, 2002, pp. 150-159.
Koetter, R., et al., "Beyond routing: an algebraic approach to network coding," Proceedings of IEEE Infocom 2002, vol. 1, Jun. 23, 2002, pp. 122-130.
Gencata, et al., "Virtual-topology adaptation for WDM mesh networks under dynamic traffic," Proceedings of IEEE Infocom 2002, vol. 1, Jun. 23, 2002, pp. 48-56.
Lee, Inkyu, et al., "Diversity Analysis for Space-Time, Bit-Interleaved Coded Modulation Systems", Korea University, Seoul, Korea, Jan. 2007.
Papadopoulos, H., et al., "Wideband space-time coded systems with non-collocated antennas", Radio and Wireless Sympoisum, 2008 IEEE, Jan. 22, 2008, pp. 307-310.
Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.
Wong, K.K.Y., et al., "Bi-directional soft-output m-algorithm for iterative decoding", IEEE International Conference on Communications, vol. 2, Jun. 2004, pp. 792-797.
Wong, K.K.Y., et al., "Low-complexity space-time turbo equalizer with the soft-output M-algorithm for frequency-selective channels", IEEE International Conference on Communications, vol. 4, May 2005, pp. 2251-2255.
Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.
Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.
Seshadri, N., et al., "List Viterbi Decoding Algorithms with Applications", IEEE Transactions on Communications, vol. 42, No. 2/3/4, Feb./Mar./Apr. 1994, pp. 313-323.
Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.
Wong, K., "The Soft-Output M-Algorithm and Its Applications", PhD Thesis, Queens University, Kingston, Canada, Aug. 2006, 263 pages.
Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.
Taddei, Herve, et al., Mode Adaptive Unequal Error Protection for Transform Predictive Speech and Audio Coders, IEEE, 2002, pp. 165-168.
Lee, Inkyu, et al., "Code Design of Space-Time Bit-Interleaved Coded Modulation Systems for Maximum Diversity", ICC, Jun. 2004, 11 pages.
Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.
Lee, Inkyu, et al., "Code Construction for Space-Time Bit-Interleaved Coded Modulation Systems", IEEE Communications Society, 2004, 5 pages.

Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.
Lee, Heunchul, et al., "A Flexible Space-Time Coding System with Unequal Error Protection", IEEE, 2005, 5 pages.
Lee, Inkyu, et al., "Space-Time Bit-Interleaved Coded Modulation for OFDM Systems", IEEE Transactions on Signal Processing, vol. 52, No. 3, Mar. 2004, pp. 820-825.
Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.
Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.
Alamouti, Siavash M., "A Simple Transmit Diversity Technique for Wireless Communications", IEEE Journal on Select Areas in Communications, vol. 16, No. 8, Oct. 1998, pp. 1451-1458.
Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.
Kao, Chien-Yu, "A Bi-directional SOVA with Normalization for Turbo Decoding", Jun. 2006, Tainan, Taiwan, 72 pages.
Lattice Semiconductor Corp., "Turbo Decoder", IP Data Sheet, 2003, 6 pages.
US Office Action for U.S. Appl. No. 11/939,353, dated Sep. 22, 2010, 15 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 12/040,653, dated Dec. 11, 2009, 33 pages.
PCT International Preliminary Report on Patentability for PCT Patent Application No. PCT/US2008/003274, dated Sep. 24, 2009, 10 pages.
PCT International Search Report for PCT Patent Application No. PCT/US2007/013074, dated Dec. 2, 2009, 8 pgs.
Written Opinion of the International Searching Authority for PCT Patent Application No. PCT/US2007/013074, dated Dec. 2, 2009, 8 pgs.
PCT International Search Report for PCT Patent Application No. PCT/US2009/046014, dated Nov. 27, 2009, 7 pgs.
Written Opinion of the International Searching Authority for PCT Patent Application No. PCT/US2009/046014, dated Nov. 27, 2009, 8 pgs.
Stiglmayr, Stephan, et al., "Adaptive Coding and Modulation in OFDM Systems using BICM and Rate-Compatible Punctured Codes", 7 pages.
G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.
Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.
Yiu, Simon, et al., "Optimization of Distributed Space-Time Filtering", IEEE 62nd Vehicular Technology Conference, Sep. 2005, pp. 1829-1833, Piscataway, New Jersey, USA.

Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.

Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.

Papadogiannis, et al., "A Dynamic Clustering Approach in Wireless Networks with Multi-Cell Cooperative Processing", IEEE International Conference on Communications, May 19, 2008, pp. 4033-4037.

PCT International Preliminary Report on Patentability for PCT Patent Application No. PCT/US2009/053466, dated Feb. 24, 2011, 9 pages.

PCT International Preliminary Report on Patentability for PCT Patent Application No. PCT/US2009/053471, dated Feb. 24, 2011, 9 pages.

PCT International Preliminary Report on Patentability for PCT Patent Application No. PCT/US2009/054937, dated Mar. 10, 2011, 8 pages.

PCT International Preliminary Report on Patentability for PCT Patent Application No. PCT/US2009/056865, dated Mar. 24, 2011, 12 pgs.

European Office Action for European Patent Application No. 07862325.3, Apr. 7, 2011, 6 pgs.

\* cited by examiner $x(1), x(2), \ldots, x(k)$: scalar information-bearing symbols (inputs to baseline OSTBC)
$B$ : output matrix of baseline code of dimension "$t$" times "$n$"
$b_i$ : output vector of baseline code (of dimension "$t$") associated with $i$th transmit antenna
$b_i(m)$ : $m$th output sample of baseline code over $i$th transmit antenna $$B = B(x(1), x(2), \ldots, x(k)) = [\, b_1\ b_2\ \ldots\ b_n\,]$$

$$b_i = b_i(x(1), x(2), \ldots, x(k)) = [\, b_i(1)\ b_i(2)\ \ldots\ b_i(t)\,]^T$$

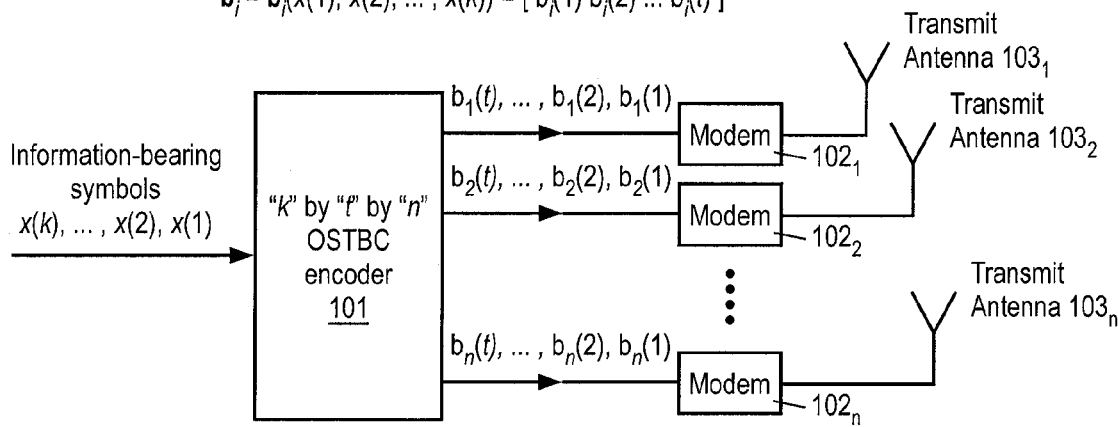

FIG. 1

$s(1), s(2), \ldots, s(k)$: information symbol vectors of dimension "$N$" (inputs to induced OSTBC)
$\underline{B}$ : output matrix of induced code of dimension "$T$" times "$n$"
$\underline{b}_i$ : output vector of induced code (of dimension "$T$") associated with $i$th transmit base station
$\underline{b}_i(m)$ : $m$th output sample of induced code over $i$th transmit base station $$\underline{B} = \underline{B}(s(1), s(2), \ldots, s(k)) = [\, \underline{b}_1\ \underline{b}_2\ \ldots\ \underline{b}_n\,]$$

$$\underline{b}_i = \underline{b}_i(s(1), s(2), \ldots, s(k)) = [\, \underline{b}_i(1)\ \underline{b}_i(2)\ \ldots\ \underline{b}_i(t)\,]^T$$

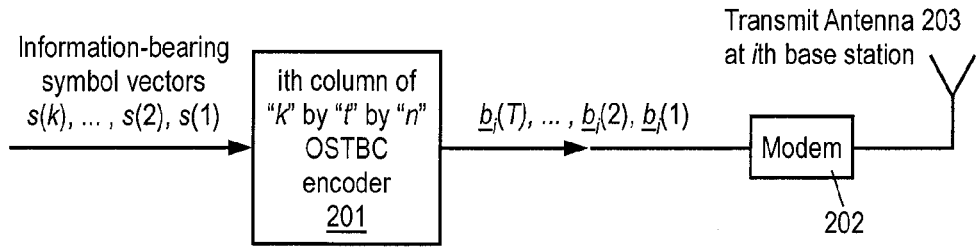

FIG. 2

$$V = \begin{bmatrix} v_1 & 0 & 0 & 0 & \cdots & 0 \\ 0 & 0 & 0 & 0 & \ddots & v_N \\ \vdots & \vdots & \vdots & \ddots & \ddots & 0 \\ 0 & 0 & 0 & v_4 & \ddots & \vdots \\ 0 & 0 & v_3 & 0 & \cdots & 0 \\ 0 & v_2 & 0 & 0 & \cdots & 0 \end{bmatrix}$$

FIG. 3

$$B = \begin{bmatrix} x(1) & x(2) \\ x^*(2) & -x^*(1) \end{bmatrix}$$

Rows: 1, 2 (Time slots); Columns: 1, 2 ← Antenna #

$$\underline{B} = \begin{bmatrix} GFs(1) & GFs(2) \\ GU^*F^*s^*(2) & -GU^*F^*s^*(1) \end{bmatrix}$$

Rows: 1 − (L + N), (L + N + 1) − 2×(L + N) (Time slots); Columns: 1, 2 ← Base station #

FIG. 4

$$B = \begin{matrix} & \text{1} & \text{2} & \text{3} & \text{4} \leftarrow \text{Antenna \#} \\ \text{1} \\ \text{2} \\ \text{3} \\ \text{4} \end{matrix} \begin{bmatrix} x(1) & x(2) & x(3) & 0 \\ -x^*(2) & x^*(1) & 0 & x(3) \\ x^*(3) & 0 & -x^*(1) & x(2) \\ 0 & x^*(3) & -x^*(2) & -x(1) \end{bmatrix}$$

↑ Time slots $$\underline{B} = \begin{matrix} & \text{1} & \text{2} & \text{3} & \text{4} \leftarrow \text{Base station \#} \\ 1 - (L+N) \\ (L+N+1) - 2 \times (L+N) \\ 2 \times (L+N) + 1 - 3 \times (L+N) \\ 3 \times (L+N) + 1 - 4 \times (L+N) \end{matrix} \begin{bmatrix} GFs(1) & GFs(2) & GFs(3) & 0 \\ -GU^*F^*s^*(2) & GU^*F^*s^*(1) & 0 & GFs(3) \\ GU^*F^*s^*(3) & 0 & -GU^*F^*s^*(1) & GFs(2) \\ 0 & GU^*F^*s^*(3) & -GU^*F^*s^*(2) & -GFs(1) \end{bmatrix}$$

↑ Time slots

FIG. 5

Induced OSTBC-Receiver r: block of T consecutive samples (at output of baud-rate sampler) associated with transmission of a information-bearing vector s (of dimension K)

$r(1), r(2), \ldots, r(t)$: partition of r into t vectors of dimension N+L y(m): a vector of dimension N; The ith entry of y(m) equals the "L+i"th entry of r(m)

y: vector of dimension Nt (N times t); y is the concatenation of $y(1), y(2), \ldots, y(t)$ Y: real-valued vector of dimension 2Nt (2 times N times t);
   Y is the concatenation of the real and imaginary parts of y X: real-valued vector of dimension 2K (2 times K)

x: complex-valued vector of dimension K

H: matrix in representation Y = H S+W

S: concatenation of the real and imaginary parts of s

W: noise/interference vector)

Slicer: symbol-by-symbol decoding module

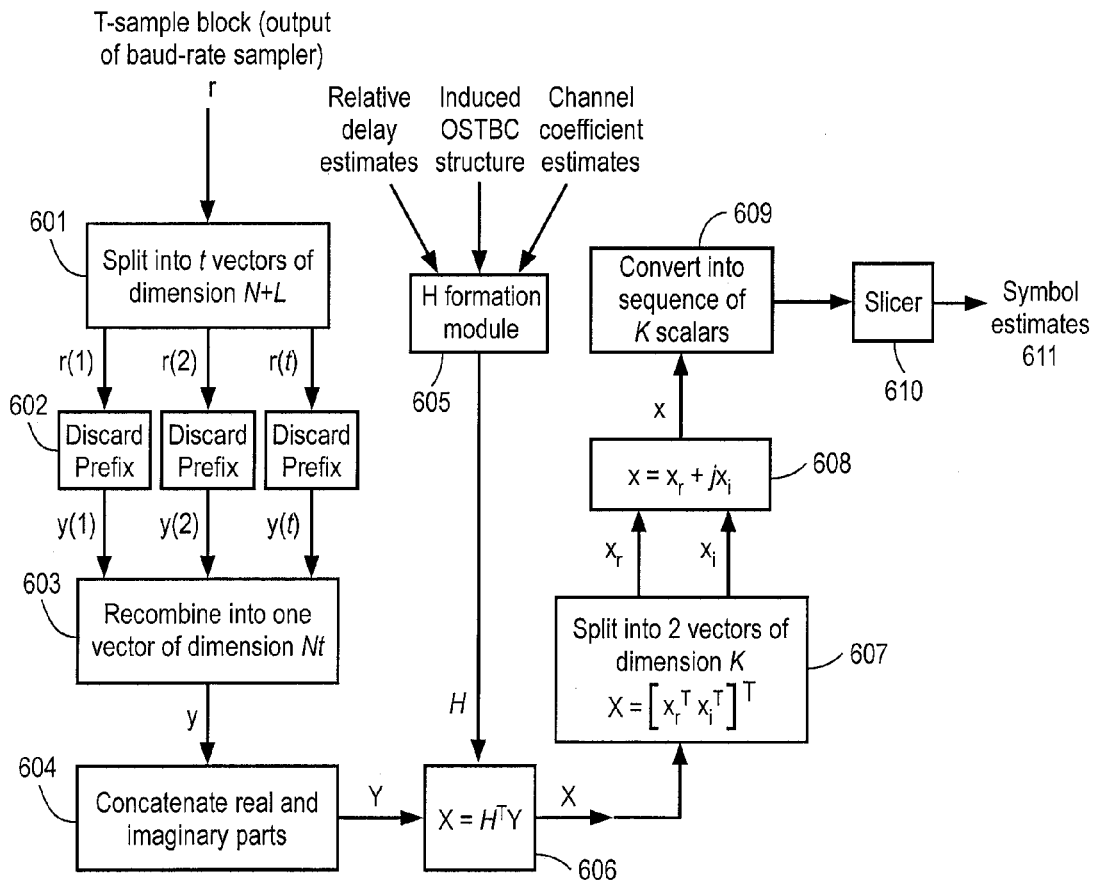

FIG. 6

FIG. 8 s(1), s(2): information symbol vectors of dimension "N" (inputs to OFDM based OSTBC)
S/P: serial to parallel converter
P/S: parallel to serial converter
Modem: pulse-shaping, amplification, modulation to RF
Encoder at Base Station 1
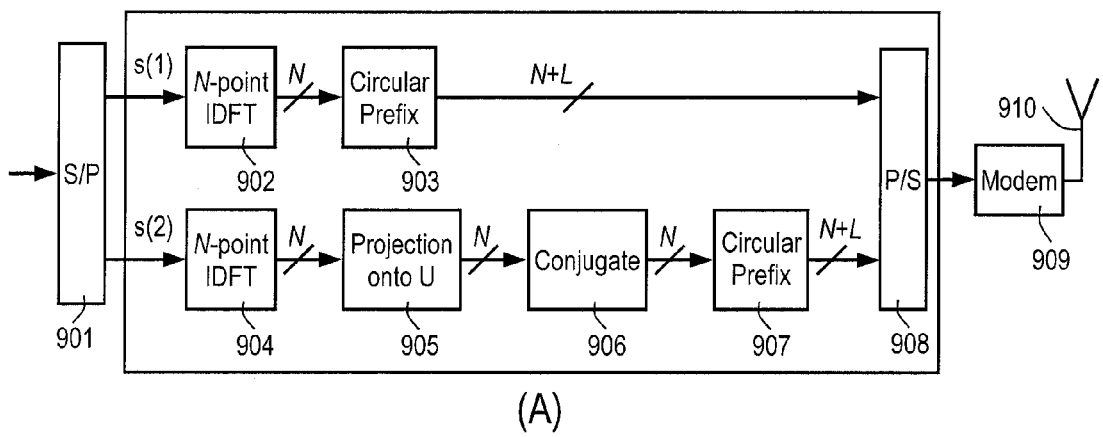
(A)
Encoder at Base Station 2
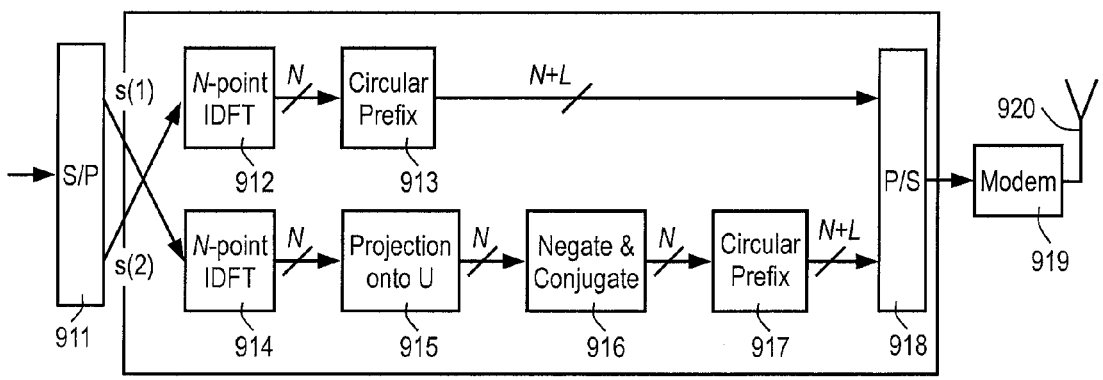
(B)
FIG. 9 r: block of T consecutive samples (at output of baud-rate sampler) associated with transmission of a uniform-bearing vector s (of dimension K)
r(1), r(2): partition of r into 2 vectors of dimension N+L
y(m): a vector of dimension N; The ith entry of y(m) equals the "L+i"th entry of r(m)
$\tau(i)$: relative delay (estimate) associated with the signal from antenna i
h(i): scaling fading coefficient (estimate) associate with the ith channel
symbol-by-symbol detection: element-wise (e.g., minimum-distance) detector

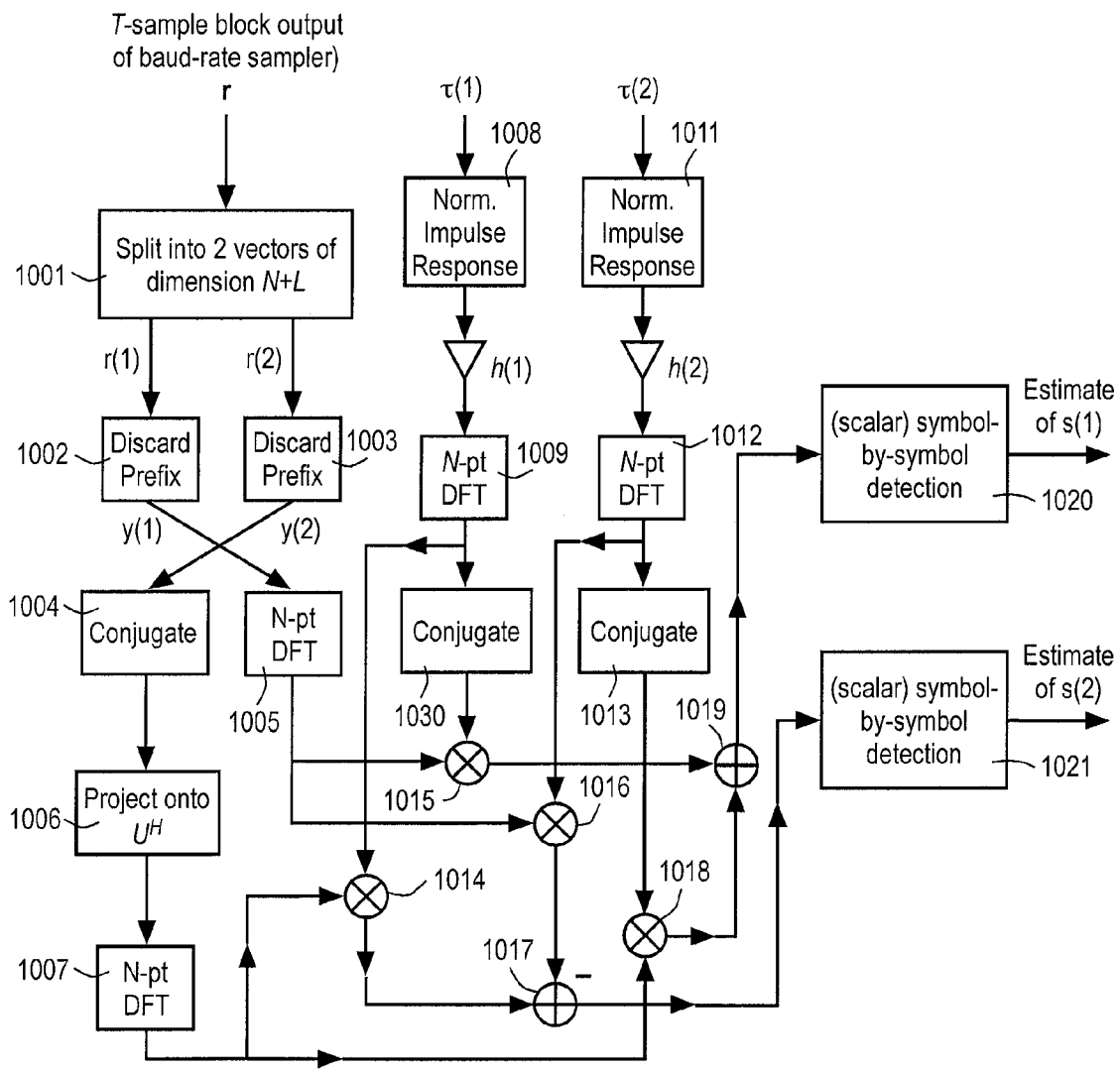

FIG. 10

METHOD AND APPARATUS FOR ASYNCHRONOUS SPACE-TIME CODED TRANSMISSION FROM MULTIPLE BASE STATIONS OVER WIRELESS RADIO NETWORKS

PRIORITY

The present patent application claims priority to and incorporates by reference the corresponding provisional patent application Ser. No. 60/857,265, titled, "A Method and Apparatus for Asynchronous Space-Time Coded Transmission from Multiple Base Stations Over Wireless Radio Networks," filed on Nov. 6, 2006.

FIELD OF THE INVENTION

The present invention relates to the field of wireless communication; more particularly, the present invention relates to transmitting the same information from multiple base-stations to one or more receivers via cooperative signaling.

BACKGROUND OF THE INVENTION

A number of recently developed techniques and emerging standards are based on employing multiple antennas at a base station to improve the reliability of data communication over wireless media without compromising the effective data rate of the wireless systems. Specifically, recent advances in wireless communications have demonstrated that by jointly encoding symbols over time and transmit antennas at a base station, one can obtain reliability (diversity) benefits as well as increases in the effective data rate from the base station to each cellular user. These multiplexing (throughput) gain and diversity benefits depend on the space-time coding techniques employed at the base station. The multiplexing gains and diversity benefits are also inherently dependent on the number of transmit and receive antennas in the system being deployed, in the sense that they are fundamentally limited by the multiplexing-diversity trade-offs curves that are dictated by the number of transmit and the number of receive antennas in the system.

In many emerging and future radio networks, the data for any particular cell user may be available to multiple base stations. Viewing each of the base stations with data for a particular user as an element of a virtual antenna array suggests using cooperative signal encoding schemes across these base stations to provide diversity benefits to the desired user. Thus, when transmitting the same data from two active base stations, each active base station must encode its data independently. Since the encoded signals, however, are transmitted by spatially dispersed base-stations, they arrive at the receiver with distinct relative delays with one another, i.e., asynchronously. That is, there can be a lack of time-synchronization between the transmissions from different base stations to the receiver. This asynchrony can arise due to the fact that the individual base stations may be operating independently, but also due to the fact that even if the signals the signals transmitted from spatially dispersed base stations to a receiver are transmitted synchronously, they may arrive asynchronously at the receiver. Although these relative delays can, in principle, be estimated at the receiver, they are not known (and thus cannot be adjusted for) at the transmitting base stations, unless there is relative-delay information feedback from the receiver to the transmitting base stations.

A large collection of space time block codes (STBCs) have been proposed in recent years as a way of providing diversity and/or multiplexing benefits by exploiting multiple transmit antennas in the forward link of cellular systems. Given the presence of n transmit antennas, the typical objective is to design STBCs that provide order-"n" transmit-antenna diversity in the system. Typical STBC designs transmit an antenna-specific block of t samples per antenna for each block of k information symbols. Such STBC designs are described by a STBC matrix with t rows and n columns, whereby the (i,j)th entry denotes the sample transmitted by the antenna j at time i. Of interest is the actual symbol rate of the STBC scheme, R, which is equal to k/t (i.e., the ratio of k over t). Full rate STBCs are STBCs whose rate R equals 1 symbol per channel use. Another important attribute of a STBC is its decoding complexity.

Existing orthogonal space-time block codes that have been designed and optimized for the synchronous setting perform poorly, in general, in the asynchronous non-collocated antennas setting. For instance, it is well known that the Alamouti code is the best space-time block code for a two-transmit one-receive antenna system. Although the Alamouti code provides full rate, full diversity, maximum coding gain, and symbol-by-symbol decoding in the synchronous setting, it provides no spatial diversity in the case that there is a one-sample relative delay offset at the receiver between the signals transmitted by the two base-stations. This observation is more general, in that, codes that have been optimized for the synchronous setting perform, in general, poorly in the presence of relative delay offsets in the arrival times of signals transmitted from different base stations. For more information on Alamouti codes, see S. M. Alamouti, "A simple transmitter diversity scheme for wireless communications," *IEEE Journal Selected Areas in Communications*, pp. 1451-1458, October 1998.

One class of designs for transmitting to a receiver from n potentially asynchronous base stations has been presented in S. Wei, D. Goeckel, and M. Valenti, "Asynchronous cooperative diversity," *Proceedings Conf. Information Sciences and Systems*, Princeton University, March 2004. The proposed method employs space-time block coding with BPSK modulation without reducing the symbol rate. The resulting full-rate schemes rely on the presence of a Viterbi decoder at the receiver in order to be able to provide full diversity at the receiver regardless of the delay offset, provided however that it does not exceed a predetermined value L. Despite being a full-rate full-diversity scheme, this technique inherently possesses a number of important limitations. First, the data block size and the decoding complexity of the proposed algorithms, required to obtain full spatial diversity are both exponential in the delay parameter, L; hence, the decoding complexity and delay become prohibitively expensive fast as the number of transmit base stations increases. Second, although full rate in the sense that 1 symbol is communicated per channel use, these schemes only work with BPSK modulation (which, being a real-valued modulation scheme, uses only half of the available degrees of freedom); as a result, the rate of these schemes is equivalent to that of half-rate QPSK schemes (which use both dimensions in the complex plane to modulate symbols).

Another class of approaches exploits space-time trellis code designs that are designed to provide full diversity regardless of the relative delay subject to maximum allowable relative delay offset, L. These codes exploit constructions based on shift-full rank matrices that guarantee that the matrices provide full diversity regardless of the relative delay set. Although they provide full diversity subject to a set of relative delays with only a small overhead in data rate, these designs have some important limitations. First, the decoding complexity of these designs is exponential both in the number of antennas, and the parameter L. Second, the design is modulation scheme specific. Finally, they are guaranteed to provide full diversity subject to relative delay offsets that are integer multiples of the symbol duration. Strictly speaking, however, there are no guarantees for relative delays that are fractions of the symbol duration.

Although the decoding complexity of the optimal decoder for arbitrary STBCs is exponential in the number k of jointly encoded symbols, there exist designs with much lower complexity. One such attractive class of designs, referred to as orthogonal space-time codes (OSTBCs), can provide full diversity while their optimal decoding decouples to (linear processing followed by) symbol-by-symbol decoding. Full rate OSTBCs exist only for a two transmit-antenna system. For three or more antennas, the rate cannot exceed ¾ symbols/per channel use. This rate is achievable for n=3 and n=4 antennas. For more than four antennas the highest-rate OSTBCs are not known in general. In general, a rate equal to ½ symbols/channel use is always achievable, but, often, higher rates may also attainable for specific values of n.

Classes of systems that have been employed in Europe for broadcasting common audio/video information from several base stations are exploiting coded OFDM transmission under the umbrella of the single frequency network (SFN) concept (e.g., see J. H. STOTT, J. H., 1996. "The DVB terrestrial (DVB-T) specification and its implementation in a practical modem," *Proceedings of the 1996 International Broadcasting Convention, IEE Conference Publication No. 428*, pp. 255-260, September 1996). These systems employ a common coded OFDM based transmission from each of the broadcasting base-stations. The OFDM based transmission allows asynchronous reception of the multitude of signals and provides increased coverage. However, as all base-stations transmit the same coded version of the information-bearing signal, SFN systems do not provide in general full transmit base-station diversity (some form of it is available as multi-path diversity, although limited).

A class of schemes includes space-time bit-interleaved coded modulation systems with OFDM and can provide both spatial diversity and can cope with asynchronous transmission. Although these schemes can provide full diversity and very good data rates, they are disadvantageous because the decoder complexity of such schemes grows exponentially with the number of transmit antennas used over all the base stations, and the number of bits/per symbol in the employed modulation scheme.

SUMMARY OF THE INVENTION

A method and apparatus is disclosed herein for asynchronous space-time coded transmission from multiple stations. In one embodiment, the method comprises one or more terminals and at least two base stations wirelessly communicating information-bearing signals to the one or more terminals using orthogonal space-time block codes. In one embodiment, the proposed codes maintain "orthogonality" at the receiver even in the presence of asynchronous signal reception among signals transmitted from distinct transmit base stations.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a block diagram of one embodiment of a high-level encoder of the baseline orthogonal space time block codes (OSTBCs).

FIG. 2 is a block diagram of one embodiment of a high-level encoder of the induced OSTBCs.

FIG. 3 illustrates the structure of one embodiment of a matrix V in Table 1.

FIG. 4 illustrates a code construction for a two transmit-base station system with a single transmit antenna.

FIG. 5 illustrates a code construction for a four transmit-base station system in which each base station employs a single transmit antenna.

FIG. 6 is a block diagram of a data decoding structure for an induced OSTBC receiver.

FIG. 8 is a block diagram of an encoding and transmission system of a sample antenna at a base station.

FIGS. 9A and 9B illustrate embodiments of two different base station encoders for the OSTBC shown in FIG. 4.

FIG. 10 is a block diagram of one embodiment of a front-end of a receiver that uses OFDM-based induced OSTBC.

DETAILED DESCRIPTION OF THE PRESENT INVENTION

Figure 7:
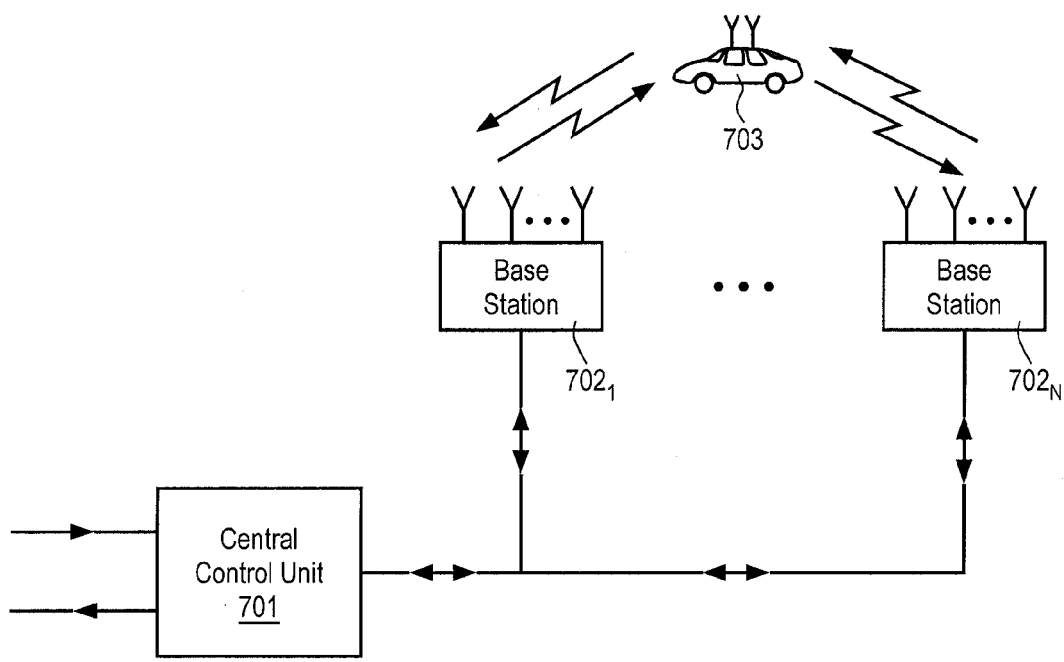
FIG. 7 illustrates an asynchronous communication system.

Methods and apparatuses for transmitting an information-bearing stream of symbols from multiple base stations to one or more designated mobile receivers are disclosed. In one embodiment, the transmission is achieved by using a space-time block code across all transmitting base stations. A space-time block code is a block-by-block encoding and transmission method in which each block of information symbols to be transmitted by a base station is encoded into a base station specific block of samples for transmission. In one embodiment, the space-time codes allow data decoding at any mobile, even in the case that the signals transmitted by distinct base stations are received at the mobile asynchronously, i.e., relatively delayed with respect to one another.

Codes disclosed herein can be readily employed as an inner code component of a more elaborate encoding system, designed to harvest other available forms of diversity.

Techniques described herein include, but are not limited to: (i) systematically constructing space-time block codes for the asynchronous setting via a set of systematic transformations of existing space-time block codes that are used for (single base-station) multiple transmit antenna systems; (ii) block-symbol encoding in which each block of input data symbols is mapped into a (base-station specific) block of data samples for transmission; (iii) data decoding at each mobile receiver based on an aggregate asynchronously received signal, estimates of the channel response coefficients and estimates of the relative signal transmission delays.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Techniques are disclosed for using orthogonal space-time block codes for transmitting signals from the distinct base stations for receipt with relative delay offsets. In one embodiment, a new space time code is constructed that provides full diversity, symbol-by-symbol decoding and good coding gains for asynchronous settings, assuming that the maximum of the relative delay offsets does not exceed a predetermined parameter L. In one embodiment, data in blocks larger than the memory of the baseline orthogonal code are encoded at a lower rate, thereby increasing the dimensionality of the signal space and allowing diversity benefits to be realized for any set of pairwise relative delay offsets, where the maximum relative delay is at most L samples. Also, systematically transforming an orthogonal code that is for the synchronous setting to obtain an orthogonal space-time code transmission, full diversity and symbol-by-symbol decoding is provided for all relative delay offsets up to the maximum allowable L at the cost of data rate and delay. The transformation constructs a new space-time block code matrix by systematically replacing each of the elements in the baseline orthogonal space-time block code matrix with a suitably designed vector. In a slowly time-varying channel, the resulting code may suffer only a small loss in rate compared to that for the associate synchronous space-time block code. A symbol-by-symbol decoder that handles the new space-time-block code is also disclosed.

Asynchronous Orthogonal Space-Time Block Codes

In one embodiment, asynchronous orthogonal space-time block codes are used in an encoding and transmission method. In one embodiment, the inputs include a maximum relative delay (integer) parameter, $L_o$, a blocking (integer) parameter, N, and an orthogonal space-time block code for a n transmit-antenna system, which encodes blocks of k information bearing symbols into blocks of t samples (per transmit antenna) for transmission. A class of space-time block codes may be used for an n transmit-base-station system. In one embodiment, each such space-time block code are used to encode blocks of K symbols, where K equals, Nk (N times k) into blocks of T samples (per transmit base-station) for transmission, where T equals t(N+L) (i.e., t times the sum of N and L) and where the value of L is determined by the value of $L_o$ and other system parameters. Each of these codes allows low-complexity reliable decoding, provided that the maximum relative delay between signals arriving from distinct base-stations does not exceed $L_o$ times the symbol-signaling period.

Note that these signaling methods do not require that the transmitting base stations know the relative delays of arrivals of signals transmitted by different base stations.

Base Stations and System Embodiments

In one embodiment, a class of space-time block codes is used with associated transceivers to enable reliable transmission of common information from a set of base stations to one or more receivers over wireless channels. In one embodiment, the transceivers achieve reliable transmission of a common information signal by sending distinct encodings from a set of base stations without the need for synchronizing the transmissions, even with an arbitrary set of relative delays in the reception of the signals transmitted from different base stations, provided that the maximum relative delay between transmissions does not exceed an a priori determined value.

In one embodiment, the transceiver operates to provide asynchronous reliable communication of a symbol stream from n transmitting base stations to one or more receivers, where each transmitting base station has available the same information-bearing symbol stream that is to be communicated to the receiver(s). In one embodiment, multiple base stations in a system use an orthogonal space-time block code, referred to herein as the "induced" code. In one embodiment, the induced OSTBC is generated via systematic transformations of a multiple transmit-antenna orthogonal space-time block code, referred to herein as the "baseline" code.

In one embodiment, an (induced) n transmitting base station space-time block code is generated by applying systematic transformations on an existing (baseline) n transmit-antenna OSTBC. More specifically, in one embodiment, to design a space-time block code for an n transmit base-station system in which each base station has a single transmit antenna, a baseline k-by-t-by-n orthogonal space-time block code (i.e., an OSTBC that encodes k information symbols at a time into a block of t time slots, over n (collocated) antennas) is used. Given such a baseline code, a maximum allowable relative delay in the signals received from multiple base stations, and a blocking integer parameter N, a K-by-T-by-n induced OSTBC is generated that encodes K information symbols at a time over a block of T time slots, and over n single-antenna transmit base-stations. A code is the mapping that dictates the samples that are going to be transmitted (over each antenna and over time) given a sequence of data symbols. A block code does the coding in blocks of symbols at a time: give a (arbitrary) set of k symbols is to be transmitted the code dictates what gets transmitted (over time and antenna). In one embodiment, the choice of the block code (mapping) is performed once and prior to signal transmission. As an example, consider the system in FIG. 9. Using with the Alamouti Code as the baseline code, a new induced code is designed (a priori and once). The new induced code is as shown in FIG. 4 and where, in addition, F is chosen to be the inverse DFT matrix (normalized so that it's unitary), and U is chosen to be a time-reversal matrix. The implementation of the encoder for the resulting selection of an induced OSTBC at each of the transmitting base-station is as shown in FIG. 9. In one embodiment, the values of the integers K and T are determined as follows. The integer K equals N times k, signifying that, for each scalar symbol encoded by the baseline code, the induced code encodes a vector of N symbols. The induced code encodes K symbols at a time into blocks of T samples/per transmit base-station, where T equals t(N+L) (i.e., t times the sum of N and L) and where L is chosen so as to satisfy the maximum allowable relative delay constraint. Specifically, assuming the induced code is expected to allow reliable asynchronous communication whenever the relative reception delay between any two signals transmitted from distinct base stations does not exceed $L_o$ times the symbol signaling period (and where $L_o$ denotes a pre-determined design parameter), the value of L set to be equal $L_o$ plus a predetermined modem-dependent constant $L_\delta$. Using the induced code, one embodiment of an encoding scheme performed by an encoder, as well as a corresponding decode scheme performed by an encoder, provides the full transmit base-station diversity available in the set of n transmitting base stations, provided the maximum relative delay between all pairs of received signals from transmitting base stations is at most $L_o$ times the symbol signaling period.

For decoding at a receiver, given knowledge of the set of relative sampling delays at the receiver, knowledge (estimates in practice) of the n fading channel coefficients, and the OSTBC structure, the receiver performs a linear transformation of the received signal followed by symbol-by-symbol decoding. Note that the decoding operation for the induced code base system (system of interest) is different that the one for the baseline code system. In each case, the decoder operates according to the specific code employed, but it also depends on the channel model (synchronous vs. asynchronous, flat fading vs. frequency selective fading, etc) and on what is known about the channel at the receiver. Note that for a general space-time code the "best" (in terms of reliability, i.e., probability of error) detector can in principle be determined, although it might be too complex to implement in practice. In the case of orthogonal codes, this detector is simple over flat fading synchronous channels: (i) a linear operation (multiplication by a matrix) of the received column, yielding a vector of the size of the information vector; (ii) symbol-by-symbol decoding: the ith symbol in the information vector that was transmitted by the code is directly decoded from the ith sample of the vector generated by the linear operation in (i). The best detector for an induced code is also of the form (i)/(ii) for synchronous channels, but also for asynchronous (flat fading) channels as well (up to a maximum relative delay). The linear operation in (i) is different for the induced code than for the baseline code. Furthermore, in the case of the induced code, it does not only depend on the code but also on the channel characteristics as well as the actual relative delays (see FIG. 10).

Although the induced codes presented above are for a setting involving n transmit base stations, each with a single antenna, the same induced codes can be applied in other settings where there is an arbitrary number of transmit antennas at each base station. In that case, "n" denotes the total number of antennas in the system. For example, if the information bearing signal is to be transmitted from three base stations, where base station 1 and 2 have two transmit antennas each, and base station 3 has four transmit antennas, "n" equals 8.

FIGS. 1 and 2 show typical high-level encoder implementations of the baseline and induced OSTBCs, respectively. In FIG. 1, x(1), x(2), . . . , x(k), are used to denote a typical block of k scalar, complex-valued information-bearing symbols that are inputs to the baseline OSTBC. Encoder 101 receives information-baring symbols x(k), . . . , x(2), x(1). Given such a set of inputs, baseline encoder 101 generates a baseline code that is represented by a matrix B of dimensions t by n, represented below as:

$$B = B(x(1), x(2), \ldots, x(k)) = [b_1 b_2 \ldots b_n]$$

Encoder 101 generates an output vector of the baseline code (of dimension "t") associated with the ith transmit antenna. This is shown below as:

$$b_i = b_i(x(1), x(2), \ldots, x(k)) = [b_i(1) b_i(2) \ldots b_i(t)]^T$$

As shown in FIG. 1, the (j,i)th element of B denotes the sample that is to be transmitted by the antenna i at time j, in the context of an n transmit-antenna system utilizing the baseline code. Thus, encoder 101 outputs $b_i(n)$, which represents the nth output sample of the baseline code over the ith transmit antenna. For example, encoder 101 generates an output to a transmit antenna $103_1$ (via modem $102_1$ 1), that is represented as $b_1(t), \ldots, b_1(2), b_1(1)$. The same can be said for each of the other output samples of baseline code from encoder 101 for transmission over the second through nth transmit antenna.

Similarly, in FIG. 2, s(1), s(2), . . . , s(k), denote a typical block of k information-bearing symbol input vectors of dimension N that are inputs to the induced OSTBC according to one embodiment of the present invention. The i-th vector s(i) is a vector (or block) of N scalar complex-valued, information-bearing symbols in the induced code (where N denotes the blocking factor in the construction). Given such a set of input vectors, induced encoder 201 generates an induced code that is represented by a matrix $\overline{B}$ with T rows and n columns, where T equals t times the sum of N and L. The output matrix $\overline{B}$ of induced code of dimension "T"×"n" may be represented as follows:

$$\underline{B} = \underline{B}(s(1), s(2), \ldots, s(k)) = [\underline{b}_1 \underline{b}_2 \ldots \underline{b}_n]$$

As shown in FIG. 2, the (j,i)th element of $\overline{B}$ denotes the sample that is to be transmitted by the i-th base station at time j, in the context of an n transmit base-station system utilizing the induced code. Thus, the output vector of induced code (of dimension "T") associated with the ith transmit base station is as follows:

$$\underline{B}_i = \underline{b}_i(s(1), s(2), \ldots, s(k)) = [\underline{b}_i(1)\ \underline{b}_i(2)\ \ldots\ \underline{b}_i(T)]^T$$

More specifically, in response to information-bearing symbol vectors $s(k), \ldots, s(2), s(1)$, encoder 201 outputs $\underline{b}_i(T), \ldots, \underline{b}_i(2), \underline{b}_i(1)$. The output of encoder 201 is received by modem 202, which causes the symbols to be transmitted via transmit antenna 203 at the ith base station.

In one embodiment, the induced orthogonal space-time block code $\underline{B}$ is generated by systematic transformations of the elements of the associated baseline code B. More specifically, in one embodiment, each entry of the baseline OSTBC equals one of the following: (i) the value zero; (ii) one of the k input symbols; (iii) one of the k input symbols negated; (iv) the complex conjugate of an input symbol; (v) the negative of the complex conjugate of an input symbol. Therefore, to generate the induced OSTBC, initially the mth vector input to $\underline{B}$, $s(m)$, is paired with the mth scalar input to B (i.e., $x(m)$). Then $\underline{B}$ is generated from B by replacing each entry of B with a vector of dimension N+L according to the rules specified in Table 1 below:

TABLE 1

| Entry of Original OSTBC (scalar) | Associated Entry of induced OSTBC (vector) |
|---|---|
| $x(m)$ | $GFs(m)$ |
| $-x(m)$ | $-GFs(m)$ |
| $x^*(m)$ | $GU^*F^*s^*(m)$ |
| $-x^*(m)$ | $-GU^*F^*s^*(m)$ |
| 0 | 0 |

Referring to Table 1 above, systematic construction of the induced OSTBC from a baseline OSTBC is shown. Each information-bearing symbol $x(m)$ in the baseline OSTBC matrix B is associated with a vector of information bearing symbols $s(m)$, of dimension N, in the induced code $\underline{B}$. To construct the induced matrix $\underline{B}$, each scalar entry of the original OSTBC matrix B is replaced by a vector entry of dimension N+L, according to the table above. The matrix F is a unitary matrix with N rows and N columns. The matrix G has N+L rows and N columns. The transformation process takes as an input a vector of dimension N and produces a vector of dimension N+L, in which the last N entries of the output vector are the entries of the input vector (in the same order) and in which the L first entries of the output vector are the last L entries of the input vector (in the same order). The matrix U is of the form $U=\Phi V\Phi^H$, where $\Phi$ is a DFT matrix of dimension N, and V is a matrix with N rows and N columns that has the form shown in FIG. 3. Finally, the superscripts "*" and "$H$" denote element-wise conjugation and the Hermitian (conjugate transpose) operation, respectively. For more information on these operations, see R. A. Horn and C. R. Johnson, *Matrix Analysis*. New York: Cambridge Univ. Press, 1994.

As shown in Table 1, all vectors of dimension N+L that replace elements of B in order to generate $\underline{B}$ are generated via conjugation or linear operations. In one embodiment, the matrices F and U employed in these transformations are restricted to have a structure that guarantees that the resulting induced OSTBC has the desired properties. Specifically, F is a unitary matrix of N rows and N columns. The matrix U also has N rows and N columns and is also unitary. In addition, it has the form $U=\Phi V\Phi^H$, where $\Phi$ is a DFT matrix with N rows and N columns, and V is a matrix with N rows and N columns that has the form shown in FIG. 3, and in which each $v_i$ is a complex number with magnitude equal to 1.

One embodiment of a method for constructing the induced OSTBC as per Table 1 is given below. Consider first the case that the (i,j)th entry of B (for some i and j) is equal to $x(m)$ for some value of m. In this case, in one embodiment, this entry is replaced by a vector $v(m)$, of dimension N+L generated by: 1) generating the intermediate vector $z(m)$, of dimension N, by multiplying the vector $s(m)$ with the matrix F; 2) adding an L-sample circular prefix to $z(m)$ to produce a vector $v(m)$ (i.e., generating a vector $v(m)$ of dimension N+L where the first L entries of $v(m)$ are the last L entries of $z(m)$ and the last N entries of $v(m)$ are the entries of $z(m)$ (in the same order)); and 3) replacing the (i,j)th entry of B (equal to $x(m)$ by assumption) with $v(m)$.

Next, consider the case that the (i,j)th entry of B (for some i and j) is equal to the conjugate of $x(m)$ for some value of m. In this case, in one embodiment, this entry is replaced by a vector $u(m)$, of dimension N+L generated by: 1) generating an intermediate vector $z(m)$, of dimension N, by multiplying the element-wise complex conjugate of the vector $s(m)$ with the matrix $F^*$, which is the element-wise complex conjugate of the matrix F; 2) generating an intermediate vector $d(m)$, of dimension N, by multiplying the vector $z(m)$ with a matrix $U^*$, which is the element-wise complex conjugate of the matrix U; 3) adding an L-sample circular prefix to $d(m)$ to produce a vector $u(m)$, i.e., generate a vector $u(m)$ of dimension N+L where the first L entries of $u(m)$ are the last L entries of $d(m)$ and the last N entries of $u(m)$ are the entries of $d(m)$ (in the same order); replacing the (i,j)th entry of B (equal to the complex conjugate of $x(m)$ by assumption) with $u(m)$.

Similarly, according to Table 1, an entry of B equal to the negative of $x(m)$ is replaced by the negative of the vector $v(m)$ constructed above, while an entry of B equal to the negative of the complex conjugate of $x(m)$ is replaced by the negative of the vector $u(m)$ constructed above. Finally, each entry of B that equals zero is replaced by an all-zeros vector of dimension N+L. The resulting OSTBC encodes K (equal to N times k) scalar, complex-valued information bearing symbols over T time slots (at each base station), where T equals t times the sum of N and L. As a result, the rate of the induced OSTBC (equal to K over T) is a fraction N/(N+L) (i.e., N over the sum of N and L) of the baseline OSTBC.

FIG. 4 shows the special case of generating a code to be used with a two-transmit base station system, where each base station has a single transmit antenna per base station using the Alamouti code. Referring to FIG. 4, the baseline Alamouti code (depicted via the matrix B above) codes two symbols, $x(1)$ and $x(2)$, over two time slots and two antennas. In particular, in the first time slot the ith antenna (for i=1,2) transmits symbol $x(i)$, while in the second time slot the first antenna transmits the complex conjugate of $x(2)$ and the second antenna transmits the negative of the complex conjugate of $x(1)$. The induced code is shown with the matrix $\underline{B}$ above. In one embodiment, the signal samples transmitted by the ith base station (for i=1, 2) in time slots 1 through L+N are constructed from the ith block of symbols, $s(i)$, as follows: (i) the unitary transformation F is applied on $s(i)$; (ii) the output is prepended by a circular prefix. In one embodiment, the samples transmitted by the first antenna at times L+N+1 through 2×(L+N) are generated as follows: (i) apply a unitary transformation F on the element-wise conjugate of the vector $s(2)$; (ii) apply transformation U on the resulting vector; (iii) prepend the resulting vector of dimension N with its L-sample circular prefix. The samples transmitted by the second antenna at time L+N+1 through 2×(L+N) are similarly constructed according to $\underline{B}$. For more information on the Alamouti code, see S. M. Alamouti, "A Simple Transmitter Diversity Scheme for Wireless Communications," IEEE Journal Selected Areas in Communications, pp. 1451-1458, October 1998.

FIG. 5 illustrates code construction for a four transmit base-station system, in which each base station employs a single transmit antenna. The baseline code is shown in FIG. 5 by the matrix B and is the maximum-rate four transmit antenna OSTBC. The associated induced space-time code is constructed according to Table 1 and is depicted by the matrix $\underline{B}$. Referring to FIG. 5, the baseline OSTNC, matrix B, encodes 3 symbols over four samples per antenna at a rate of ¾ symbols/channel use, and the associated induced OSTBC, $\underline{B}$, encodes 3-times-N symbols at a time over 4-times-(N+L) samples/per base-station, at a rate ¾ times N/(N+L) symbols/channel use. This code also provides a systematic induced OSTBC for a three transmit-base-station system (e.g., by dropping one of the columns of $\underline{B}$). In one embodiment, the code is used in the context of a two-base station system in which each base station has two transmit antennas. In this case, columns 1-2 of $\underline{B}$ are associated with the two transmit antennas at the one of the base stations and columns 3-4 are associated with the two transmit antennas at the other base station.

In one embodiment, encoding at the ith base station is performed as follows. First, the encoder takes as an input the symbol vector s of size K (where K equals N times k), where the symbol vector represents the information to be transmitted and is assumed to be generated at earlier stages. In one embodiment, in the pilot (channel estimation) phase, the vector s that is employed is assumed to be known at the receiver, while in the data transmission phase, the vector s represents a set of K symbols to be transmitted to the receiver and is thus unknown to the receiver. Second, the vector s of dimension K is partitioned into k vectors s(1), s(2), ..., s(k), each of dimension N. Third, the ith base station transmits a vector $b_i$, of dimension T (and where T equals t times the sum of N and L), generated according to the induced OSTBC $\underline{B}$, where $b_i$ denotes the ith column of the matrix $\underline{B}$ that is generated with input s(1), s(2), ..., s(k).

In one embodiment, the encoding process is performed using a normalized DFT matrix the unitary matrix F, with U being a time reversal matrix (i.e., a matrix such that Ux produces an order-reversed version of x). In that case, transmitting the vector GFs(m) is equivalent to an OFDM transmission with input s(m). More generally, the transmitted vector, $b_i$, is a collection of t vectors (transmitted sequentially), each of dimension N+L, in which each vector is constructed via OFDM-type operations on a particular input vector (of dimension N) according to Table 1 above.

FIG. 6 illustrates one embodiment of a symbol detection algorithm performed at a receiver. This algorithm can be readily applied for detection of the information bearing vectors s(1), s(2), ..., s(k), in the case of data transmission over slowly varying flat fading channels, but can also be applied for symbol detection over slowly-time varying frequency selective channels. In one embodiment, the channel is varying slowly enough so that accurate estimates of the channel fading coefficients can be obtained (via the pilot estimation phase) and that the receiver employs a standard front-end which consists of a linear filter (e.g., a square-root raised cosine pulse matched to the transmitter pulse-shaping filter) followed by a baud-rate sampler (with adjustable sampling times). At the output of the baud sampler, the receiver has available a sequence of samples that is a linear superposition of the responses of all transmitted OSTBC sequences in background noise.

By construction, the effective impulse response of a channel from a transmitting base station to a receiver (viewed at the output of the baud-rate sampler) is at most equal to $L_\delta$ samples long. In one embodiment, the constant $L_\delta$ is determined by the "effective" duration (in symbol periods) of the response of the pulse-shaping waveform (used at each encoder) through the receiver front-end filter. When square-root raised-cosine pulse-shaping and receiver front-end filters are employed, the value of $L_\delta$ depends on the roll-off factor employed and is typically between four and six. In addition, the first nonzero samples in the impulse responses of any two such channel responses are at most $L_o$ samples apart (due to the assumed $L_o$ maximum relative delay constraint). In one embodiment, in the channel estimation phase, estimates of the relative delays in the transmissions are first obtained, together with estimates of the channel fading coefficients.

Based on these estimates, the receiver of FIG. 6 performs the following operations:

Given the relative delay estimates, determine the block-symbol timing reference and partition the received sampled sequence into blocks of length T. In one embodiment, these operations are performed at the receiver: they are part of the timing—recovery and synchronization operations. Conceptually, the relative delays are first estimated. For this, the transmitting antennas transmit space-time coded sequences generated via pilot signals, which are known to the receiver. The receiver has an analog linear front-end (front-end filtering, demodulation, and sampling) and uses the knowledge of the transmitted signal in order to estimate and readjust its sampling times, which is an operation that is part of timing-recovery. In the asynchronous case, multiple relative delays are estimated, one for each transmit antenna. Then the blocking into r vectors (see FIGS. 6 and 10) is dictated by determining the beginning of any block as the beginning of the transmitted signal that is arriving first. These relative timing delays change slowly with time, so they can be estimated through a standard pilot-assisted channel estimation phase, used to estimate the channel fading coefficients (e.g. $\tau(1)$ and $\tau(2)$ in FIG. 10, change at a much slower rate than h(1) and h(2)). This processing is performed on a block-by-block basis. The variable r represents the received vector of concentric samples of dimension T that is associated with the current block of data.

Divider 601 partitions r into t vectors r(1), r(2), ..., r(t), each of dimension N+L, that is, $r=[r^T(1) \, r^T(2) \ldots r^T(t)]^T$. For each integer m in the set $\{1, 2, \ldots, t\}$, prefix removal unit 602 constructs a vector y(m) of dimension N, as the last N entries of the vector r(m), by removing the prefix data. Combiner 603 constructs a (complex-valued) vector y of dimension Nt (i.e., N times t). In one embodiment, combiner 603 constructs the vector by appending all the y(i)'s i.e., set $y=[y^T(1) \, y^T(2) \ldots y^T(t)]^T$. Combiner 604 constructs a real-valued vector Y of dimension 2 Nt (i.e., 2 times N times t) using the output of combiner 603. In one embodiment, combiner 604 concatenates the (element-wise) real part of y with the (element-wise) imaginary part of y.

Given knowledge of the fading coefficients, the relative delays, and the induced code structure, the receiver knows that real-valued vector Y can be expressed in the form Y=HS+W, where S denotes the real-valued vector of dimension 2K (i.e., 2 times K) that equals the concatenation of the (element-wise) real part of s and the (element-wise) imaginary part of s, H denotes a real-valued matrix with 2 Nt (i.e., 2 times N times t) rows and 2K (i.e., 2 times K) columns, which can be readily constructed at the receiver given knowledge of the fading channel coefficients, relative delays, and the induced code structure, and W is a vector of dimension 2 Nt (i.e., 2 times N times t) representing background noise and other forms of interference. Writing the received signal in this form (and thus the associated representation, including the creation of the matrix H) are straightforward operations that are well known in the art.

Using this information, computation unit 606 computes $X=H^T Y$, where X is a real valued vector of dimension 2K (2 times K). Partition unit 607 partitions X into two K dimensional vectors $x_r$ and $x_i$, as $X=[x_r^T x_i^T]^T$. Then adder 608 constructs a complex-valued K-dimensional vector x as follows: $x=x_r+j\, x_i$, and where j represents the square root of the number −1. Conversion unit 609 converts x into a sequence of K scalars. This is achieved by extracting the K scalar components out of the vector x (which has dimension K). Slicer 610 performs symbol-by-symbol (element-wise) detection on each of the scalars extracted from the vector x in order to determine the (element-wise) estimate of communicated symbol vector s, thereby inputting symbol estimates 611.

In one embodiment of the receiver, the estimates of the relative delays at the receiver (available via the channel estimation phase) are used to adjust the sampling timing of the baud-rate sampler at the receiver front-end. Such adjustments can have significant benefits from a receiver performance point of view. For instance, consider the case where a two base-station system is employed and where the relative delay between the received signals equals "half" a symbol period. It can be shown that the receiver performance is improved, and potentially optimized, when the baud-rate sampler is a quarter-sample "behind" one of the transmission and a quarter-sample "ahead" of the other, and takes its worse value when the baud-rate sampler is in-sync with one of the transmissions and half-a-sample out of sync with the other.

In another embodiment, the baud-rate sequence of samples (that is partitioned into r-type vectors of the form shown in FIG. 6) is generated by passing the (down converted continuous-time) received signal through the following cascade of systems that includes: a linear front-end filter (e.g., a square-root raised cosine filter); an oversample-by-M system where M is an integer greater than 1 (this system keeps M samples per symbol period); a discrete-time delay-by-$n_o$-samples system (the output of this system is its input delayed by $n_o$-samples); and a decimate-by-M system (this system generates an output by discarding all by every Mth sample of the input sequence). In this case, the estimates of the relative sampling times (available at the receiver via the pilot phase) can be employed to adjust the (integer) delay parameter $n_o$ in the delay-by-$n_o$ system prior to the decimator in order to optimize the decoder performance.

An Example of a Two-Based Station Embodiment

FIG. 7 illustrates an asynchronous wireless transmission from multiple base stations to mobile receivers. Referring to FIG. 7, multiple base stations $702_{1-n}$ are shown, and each of these base stations has multiple antennas for communicating with mobile receivers, such as mobile receiver 703. Central control unit 701 is communicably coupled to base stations $702_{1-n}$ to control base stations $702_{1-n}$.

Figure 8:
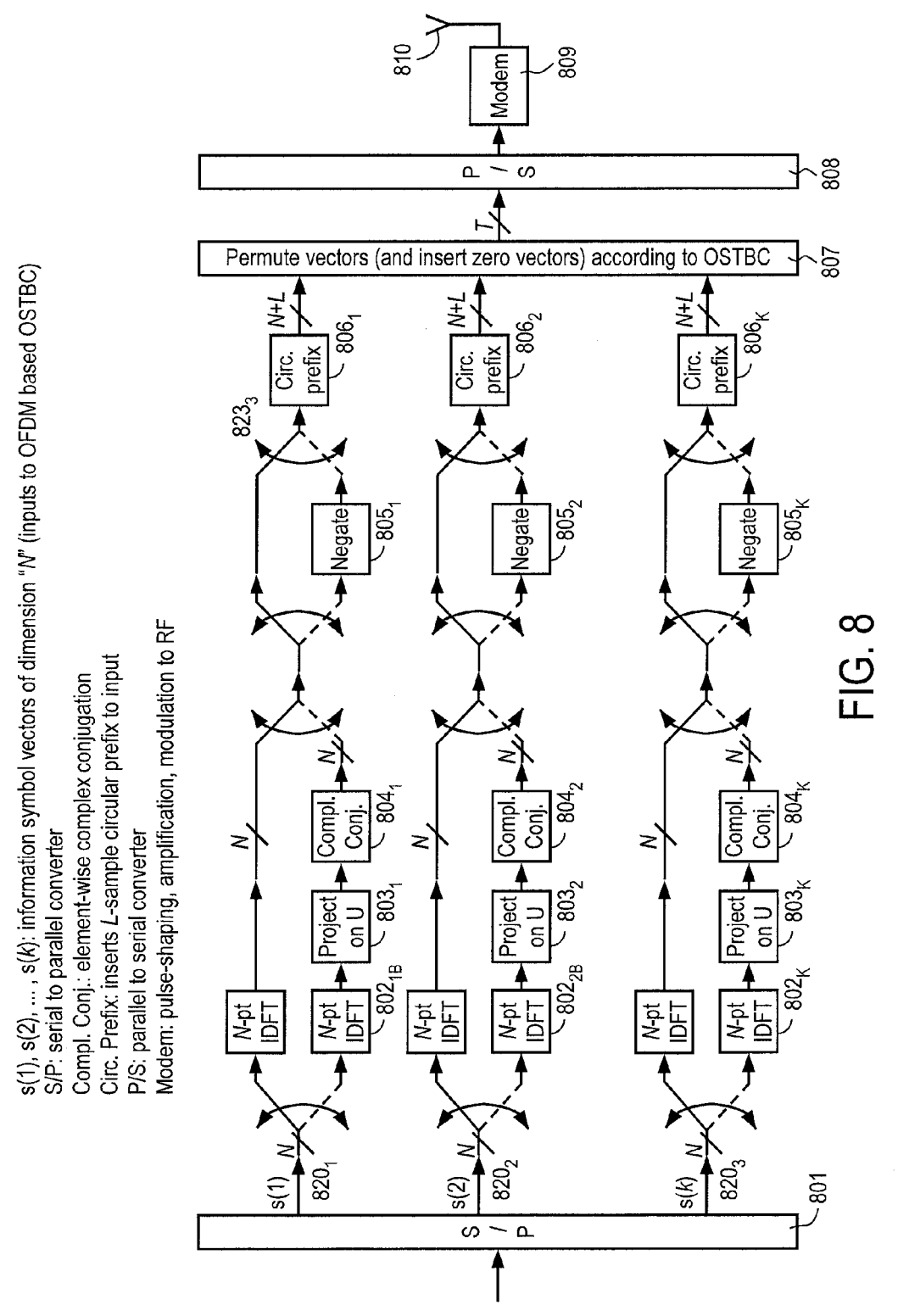

FIG. 8 is a block diagram of one embodiment of an OFDM-based OSTBC encoder used by one of base stations $702_{1-n}$ for encoding for transmission on a typical antenna element. In this embodiment, the unitary matrix F is a (normalized) inverse DFT matrix. Referring to FIG. 8, the encoder takes as input the information-bearing symbols, or samples generated by an outer code in the system. Encoding is performed in blocks of size K, where K equals k times N. Serial-to-parallel converter 801 splits each block of K symbols into k sub-blocks, information symbol vectors s(1), s(2), . . . , s(k), each of which has N symbols. Each block is then individually processed as shown in FIG. 8, with the switches $820_{1-k}$, $821_{1-k}$, $822_{1-k}$, and $823_{1-k}$ set according to the OSTBC column associated with the given antenna element. Specifically, regardless of the setting of switch $820_1$, the encoder applies an N-pt IDFT to k sub-block s(1). In the case where switch $820_1$ is set to the lower path, the encoder projects a matrix U $803_1$ onto the transformed data. In one embodiment, matrix U $803_1$ is a time reversal matrix. The encoder performs an element-wise complex conjugate $804_1$ to the results of projecting the transformed data onto matrix U $803_1$. Switch $821_1$ is set to the same path (lower or upper) as switch $820_1$. The results from the selected (upper or lower) path are then directed through, either the upper path of switch $822_1$ (and the upper path of $823_1$, which is always set to the same path as switch $822_1$) to circular prefix unit $806_1$, or through the lower path of switch $822_1$ to "negate" block $805_1$ and through the lower path of switch $823_1$ to circular prefix unit $806_1$. Each of the "negate" blocks $805_{1-k}$ produces at its output a vector of dimension N, whose ith entry (with i=1,2,3, . . . , N) equals minus the ith entry of the input vector. The remainder of the information symbol vectors s(2), . . . , s(k) are processed in the similar fashion.

Circular prefix units $806_{1-k}$ insert an L-sample circular prefix to create an N+L sized processed block. After processing, reorder unit 807 reorders the processed blocks and inserts blocks of zero vectors (each of dimension N+L) where appropriate, and as specified by the column of the induced space-time block code that is associated with the given antenna. For instance, if the code being implemented were the induced code shown in FIG. 5 (in which case k=3, and n=4), the reorder operation for the antenna associated with the $2^{nd}$ column of the matrix, would place first the output of prefix unit $806_2$ followed by the output of prefix unit $806_1$ followed by a vector of N+L zeros, followed by the output of prefix unit $806_3$. In one embodiment, the position of switches in FIG. 8 and the reordering operation are dictated by the column of the OFDM-based OSTBC that is associated with the given antenna element.

Finally, the T-sample vector generated by the reordering/zero insertion operation is passed through parallel-to-serial converter 808 to a modem 809, which performs pulse-shaping, amplification, and modulation to radio-frequency (RF) in a manner well-known in the art. Afterwards, modem 809 sends the data for transmission over antenna element 810.

FIGS. 9A and 9B illustrate encoders at two base stations. FIGS. 9A and 9B support an OFDM-based OSTBC implementation in each base station in a scheme involving transmission from two base stations, each with a single antenna element for transmission. The system takes as input two blocks of N (complex-valued scalar) symbols at a time.

Referring to FIG. 9A, the encoder includes serial-to-parallel converter 901 that receives a set of information symbol vectors s(1) and s(2) of dimension "N" and converts them into parallel form. N-point IDFT 902 transforms the information symbol vector s(1) into N symbols. Circular prefex unit 903 adds a prefex of L bits to the N symbols, thereby creating an N+L set of data that is sent to parallel-to serial-converter 908, where it is converted to a serial steam.

N-point IDFT 904 transforms the information symbol vector s(2) into N symbols. Then projection unit 905 projects the matrix output from N-point IDFT transform 904 onto matrix U. In one embodiment, matrix U is a time-reversal matrix. Conjugate unit 906 performs the conjugate operation on the output of projection unit 905. Circular prefetch unit 907 adds a prefex of L symbols onto the conjugated output of conjugate unit 906. The output of circular prefex unit 907 is input to parallel-to-serial converter 908, which converts data on its parallel inputs into serial form. The output of parallel-to-serial converter 908 is sent to modem 909, which causes the data to be transmitted via antenna 910.

In FIG. 9B, the encoder at the second base station is described. Referring to FIG. 9B, the encoder includes serial-to parallel converter 911 that receives a set of information symbol vectors of dimension "N" and converts them into parallel form. N-point IDFT 912 transforms the information symbol vector s(2) into N symbols. Circular prefex unit 913 adds a prefex of L bits to the N symbols, thereby creating an N+L set of data that is sent to parallel-to serial-converter 918, where it is converted to a serial steam.

N-point IDFT 914 transforms the information symbol vector s(1) into N symbols. Then projection unit 915 projects the matrix output from N-point IDFT transform 914 onto matrix U. In one embodiment, matrix U is a time-reversal matrix. Conjugate unit 916 performs the conjugate operation on the output of projection unit 915. Circular prefetch unit 917 adds a prefix of L symbols onto the conjugated output of conjugate unit 916. The output of circular prefix unit 917 is input to parallel-to-serial converter 918, which converts data on its parallel inputs into serial form. The output of parallel-to-serial converter 918 is sent to modem 919, which causes the data to be transmitted via antenna 920.

FIG. 10 is a block diagram of one embodiment of a front-end of a receiver that uses OFDM-based induced OSTBC. The operation of the receiver is straightforward (i.e., there are no timing/synchronization issues).

Referring to FIG. 10, splitter 1001 receives a T-sample block of T consecutive samples associated with transmission of an information-bearing vector s of dimension K and splits it into 2 vectors, r(1) and r(2), of dimension N+L. In one embodiment, the T-sample block is output from a baud-rate sampler. Prefix discarding units 1002 and 1002 remove the L-sample prefix from each of vectors r(1) and r(2), respectively, resulting in vectors y(1) and y(2), which are of dimension N. Note that the ith entry of y(m) equals the "L+i"th entry of r(m).

N-pt DFT unit 1005 applies the N-pt DFT to vector y(1) and sends the result to multipliers 1015 and 1016. Conjugate unit 1004 performs a conjugate on vector y(2). The conjugate of the vector y(2) is projected onto a matrix $U^H$ by unit 1006. N-pt DFT unit 1007 applies the N-pt DFT to vector result from unit 1006 and sends the result to multipliers 1014 and 1018.

The relative delay (estimate) associated with the signal from antenna 1 is used to determine the samples (a vector) in the impulse response of the relative-delay response filter 1008. The resulting vector signal is scaled element-wise by the scaling fading coefficient (estimate) h(1) associated with the first channel. An N-pt DFT is applied by unit 1009 to the result. The output of N-pt DFT unit 1009 is an input to conjugate unit 1030 and multiplier 1014. Conjugate unit 1030 determines the conjugate and outputs that to multiplier 1015.

The outputs of multiple 1014 and 1015 are sent to one input of adders 1017 and 1019.

The relative delay (estimate) associated with the signal from antenna 2 is used to determine the samples (a vector) in the impulse response of the relative-delay response filter 1011. The resulting vector signal is scaled element-wise by the scaling fading coefficient (estimate) h(2) associated with the second channel. An N-pt DFT is applied by unit 1012 to the result. The output of N-pt DFT unit 1012 is an input to conjugate unit 1013 and multiplier 1016. Conjugate unit 1013 determines the conjugate and outputs that to multiplier 1018.

The outputs of multiple 1016 and 1018 are sent to one input of adders 1017 and 1019.

Adder 1017 subtracts the output of multiplier 1016 from the output of multiplier 1014. Adder 1019 adds the output of multiplier 1015 to the output of multiplier 1018.

The (two) inputs to each adder module 1017 and 1019 are vectors of dimension N. The output is the element-wise sum vector, i.e., a vector of dimension N, where each entry is the sum of the associated entries of the input vectors. Similarly, the (two) inputs to each multiplies are also vectors of dimension N. The output is the element-wise product vector, i.e., a vector of dimension N, where each entry is the product of the associated entries of the input vectors. Finally, each scalar symbol-by-symbol detection module 1019 and 1020 takes as input a vector of dimension N and produces a vector of detected symbols of dimension N (either of s(1) or of s(2), depending on the module #). More specifically, symbol-by-symbol detection modules 1019 and 1020 detects the ith element of the detected vector in each case (either s(1) or s(2)) is detected based on only the ith element of the input vector (input to the module).

There are a number of advantages of embodiments of the present invention. An exemplary list includes the following. First, the schemes provide full "transmit base-station" diversity, for any set of relative delays between transmitting base stations, provided that none of the relative delays of arrival exceed the maximum allowable value of $L_o$ times the symbol signaling period. Second, there is only a small loss in coding gain by these schemes compared to the underlying base-line synchronous orthogonal designs, where the loss depends on the values of N and L, and the relative delays in the arrivals of signals from different base stations, and the relative sampling timing at the receiver. Third, unlike other existing designs for asynchronous space-time codes whose complexity is exponential in the number of encoded symbols and the maximum allowable relative delay, these techniques allow for high-reliability symbol-by-symbol decoding. Specifically, given that a symbol blocking factor N is employed, the decoding complexity is at most quadratic in N and k (where k denotes the number of transmit base stations), and independent of the maximum relative delay factor, $L_o$. Also, unlike other existing designs that are tailored to specific modulation schemes, the proposed techniques are applicable to any real-valued or complex-valued modulation scheme, including, for example, but not limited to, BPSK, QPSK, QAM, and M-PSK.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A wireless communication system comprising:
  one or more terminals; and
  at least two base stations wirelessly communicating information-bearing signals to the one or more terminals using space-time block codes, including at least one of the information bearing signals being transmitted by two or more of the at least two base stations, wherein at least one of the space-time block codes is created from an induced code that is created via systematic transformations of a baseline code for joint application by the two or more base stations, wherein wirelessly communicating the at least one information-bearing signal by the two or more base stations includes, each of the two or more base stations, dividing, into blocks, a group of information signal vectors that are to be transmitted by the two or more base stations, and processing the blocks separately by, in part, applying a transform to each block separately prior to recombining the processed blocks into an information signal vector that is projected by its associated base station, the transform applied to each block by each of the two or more base stations being specified by the induced code.

2. The system defined in claim 1 wherein the at least two base stations communicate the information-bearing signals as an asynchronous space-time coded transmission.

3. The system defined in claim 1 wherein the at least two base stations have one or more transmit antennas.

4. A wireless communication system comprising:
one or more terminals; and
at least two base stations wirelessly communicating information-bearing signals to the one or more terminals using space-time block codes, including at least one of the information bearing signals being transmitted by two or more of the at least two base stations, wherein the space-time block code is created from an induced code and a baseline code, and further wherein at least one base station includes an encoder that encodes a block vector of multiple symbols using the induced code for every scalar information symbol encoded by the baseline code, by dividing, into a plurality of blocks, the block of multiple symbols, and processing the plurality of blocks separately by, in part, applying a transform to each block separately prior to recombining the processed blocks into an information signal vector that is projected by the at least one base station, the transform applied to each of the plurality of blocks being specified by the induced code.

5. A wireless communication system comprising:
one or more terminals; and
at least two base stations wirelessly communicating information-bearing signals to the one or more terminals using orthogonal space-time block codes, wherein the space-time block code is created from an induced code and a baseline code, and further wherein the induced code is generated by replacing each scalar entry of the baseline code with a vector such that an entry that is equal to zero is replaced by a vector of zeros;

an entry equal to a scalar information symbol of the baseline code is replaced by a vector generated by multiplying the associated block vector of information symbols of the induced code by a fixed first unitary matrix and then prepending a circular prefix to the resulting vector;

an entry equal to the negative of a scalar information symbol of the baseline code is replaced by the element-wise negative a vector generated by multiplying an associated block vector of information symbols of the induced code by the first unitary matrix and then prepending the circular prefix to the resulting vector;

an entry equal to the complex conjugate of a scalar information symbol of the baseline code is replaced by the element-wise conjugate a vector generated by multiplying the associated block vector of information symbols of the induced code by a fixed second unitary matrix and then prepending the circular prefix to the resulting vector; and an entry equal to the negative of the complex conjugate of a scalar information symbol of the baseline code is replaced by the element-wise negative of the conjugate a vector generated by multiplying the associated block vector of information symbols of the induced code by the second unitary matrix and then prepending the circular prefix to the resulting vector.

6. The system defined in claim 5 wherein the second matrix equals a product of a first matrix of dimensions M rows and M columns, a second matrix of dimensions M rows and M columns, an inverse of the DFT matrix and the first unitary matrix, wherein the first matrix is a DFT matrix, where M is an integer.

7. The system defined in claim 5 wherein the second matrix has a form in which all entries of a first row except the first entry equal zero and all entries of a second row except the last entry are equal to zero, and further wherein, for each subsequent row, all entries equal zero except one entry, wherein an index of the nonzero entry is one less than the index of the nonzero entry on the preceding row; and wherein all nonzero entries of the second matrix are complex-valued numbers with magnitude equal to one.

8. The system defined in claim 7 wherein the first unitary matrix is a normalized DFT matrix with M rows and M columns, where M is an integer.

9. A method comprising:
encoding a set of information-bearing signals multiple times with space-time block codes at multiple base stations, wherein at least one of the space-time block codes is created from an induced code that is created via systematic transformations of a baseline code, by dividing, into blocks, a group of information signal vectors that are to be transmitted by the multiple base stations, and processing the blocks separately by, in part, applying a transform to each block separately prior to recombining the processed blocks into an information signal vector that is projected by its associated base station, the transform applied to each block by each of the multiple base stations being specified by the induced code; and wirelessly transmitting the encoded information-bearing signals to one or more terminals.

10. The method defined in claim 9 wirelessly transmitting the encoded information-bearing signals to one or more terminals occurs as an asynchronous space-time coded transmission.

11. A transmitter comprising:
an input to provide information symbol vectors in parallel;
an encoder coupled to the input, the encoder having multiple processing paths to encode information symbol vectors in parallel using space-time block codes, wherein at least one of the space-time block codes is created from an induced code that is created via systematic transformations of a baseline code, by dividing, into blocks, a group of information signal vectors, and processing the blocks separately by, in part, applying a transform to each block separately prior to recombining the processed blocks into an information signal vector, the transform applied to each block being specified by the induced code;

a parallel-to-serial converter to convert outputs of the multiple processing paths received in parallel into serial form.

12. The transmitter defined in claim 11 wherein the multiple paths comprise:

a first path comprising
an N-point IDFT to transform a first set of information symbols, and
a first circular prefix unit to add a prefix to the first set of transformed information symbols, wherein the output of the first circular prefix unit is coupled to a first input of the parallel-to-serial converter;

a second path comprising
an N-point IDFT to transform a second set of information symbols,
a project unit to project a first matrix onto the transformed second set of information signals,
a conjugate unit to perform a conjugate operation on a first matrix resulting from projecting a first matrix onto the transformed second set of information signals; and
a second circular prefix unit to add a prefix to the conjugated second set of transformed information symbols, wherein the output of the second circular prefix unit is coupled to a second input of the parallel-to-serial converter.

13. The transmitter defined in claim 11 further comprising:
a modem coupled to receive the serial output of the parallel-to-serial converter and generate RF signals; and
an antenna coupled to the modem to transmit the RF signals.

14. A method comprising
receiving, at a receiver, multiple sets of information bearing symbols encoded using orthogonal space-time block codes from a plurality of base stations at a destination, the sets being the same from each of the plurality of base stations, wherein at least one of the space-time block codes is created from an induced code that is created via systematic transformations of a baseline code, the induced code specifying transforms to be applied each of a plurality of blocks of information signal vectors separately; and
decoding the multiple sets and aggregating results of decoding to obtain the information bearing symbols even if receipt of the multiple sets does not occur at the same time, including removing circular prefixes for each block,
wherein the received signal is (band-pass) filtered, down converted, and sampled at the baud rate, and then partitioned into blocks for decoding.

15. The method defined in claim 14 further comprising replacing each of the remaining entries in said each block by two real-values entries, its real and its imaginary part.

* * * * *